United States Patent
Agapiou et al.

(10) Patent No.: US 9,828,541 B2
(45) Date of Patent: Nov. 28, 2017

(54) FOAMING OF SET-DELAYED CEMENT COMPOSITIONS COMPRISING PUMICE AND HYDRATED LIME

(71) Applicant: Halliburton Energy Services, Inc., Houston, TX (US)

(72) Inventors: Kyriacos Agapiou, Houston, TX (US); Thomas Jason Pisklak, Cypress, TX (US); Samuel J. Lewis, Spring, TX (US); Peter James Boul, Houston, TX (US); Pauline Akinyi Otieno, Spring, TX (US); Lance Everett Brothers, Chickasha, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/098,085

(22) Filed: Apr. 13, 2016

(65) Prior Publication Data
US 2016/0222276 A1    Aug. 4, 2016

Related U.S. Application Data

(60) Division of application No. 14/032,734, filed on Sep. 20, 2013, now Pat. No. 9,328,281, which is a continuation-in-part of application No. 13/417,001, filed on Mar. 9, 2012, now Pat. No. 8,851,173.

(60) Provisional application No. 61/875,410, filed on Sep. 9, 2013.

(51) Int. Cl.
| C04B 28/18 | (2006.01) |
| C09K 8/473 | (2006.01) |
| E21B 33/13 | (2006.01) |
| C04B 40/06 | (2006.01) |
| C09K 8/467 | (2006.01) |
| C04B 38/00 | (2006.01) |
| C04B 38/10 | (2006.01) |
| C04B 111/00 | (2006.01) |

(52) U.S. Cl.
CPC .............. *C09K 8/473* (2013.01); *C04B 28/18* (2013.01); *C04B 38/0067* (2013.01); *C04B 38/10* (2013.01); *C04B 40/0658* (2013.01); *C09K 8/467* (2013.01); *E21B 33/13* (2013.01); *C04B 2111/00146* (2013.01); *C09K 2208/08* (2013.01)

(58) Field of Classification Search
None
See application file for complete search history.

(56) References Cited

U.S. PATENT DOCUMENTS

| 2,411,793 A | 11/1946 | Kennedy |
| 2,848,051 A | 8/1958 | Williams |
| 3,238,279 A | 3/1966 | Tarlton |
| 3,557,876 A | 1/1971 | Tragesser |
| 3,699,042 A | 10/1972 | Browning et al. |
| 3,887,009 A | 6/1975 | Miller et al. |
| 3,959,003 A | 5/1976 | Ostroot et al. |
| 4,054,462 A | 10/1977 | Stude |
| 4,349,443 A | 9/1982 | Block |
| 4,350,533 A | 9/1982 | Galer et al. |
| 4,462,837 A | 7/1984 | Baker et al. |
| 4,515,216 A | 5/1985 | Childs et al. |
| 4,519,452 A | 5/1985 | Tsao et al. |
| 4,524,828 A | 6/1985 | Sabins et al. |
| 4,676,832 A | 6/1987 | Childs et al. |
| 4,818,288 A | 4/1989 | Aignesberger et al. |
| 4,875,937 A | 10/1989 | Viles |
| 5,058,679 A | 10/1991 | Hale et al. |
| 5,263,542 A | 11/1993 | Brothers |
| 5,314,022 A | 5/1994 | Cowan et al. |
| 5,447,197 A | 9/1995 | Rae et al. |
| 5,503,671 A | 4/1996 | Casabonne et al. |
| 5,547,506 A | 8/1996 | Rae et al. |
| 6,173,778 B1 | 1/2001 | Rae et al. |
| 6,221,148 B1 | 4/2001 | Mathur |
| 6,333,005 B1 | 12/2001 | Nguyen et al. |
| 6,457,523 B1 | 10/2002 | Vijn et al. |
| 6,488,762 B1 | 12/2002 | Shi |
| 6,610,140 B2 | 8/2003 | Vijn et al. |
| 6,907,928 B2 | 6/2005 | Di Lullo Arias et al. |

(Continued)

FOREIGN PATENT DOCUMENTS

| WO | 2011-161411 | 12/2011 |
| WO | 2015034477 | 3/2015 |

OTHER PUBLICATIONS

Benge et al., "Deep Gas-Well Cementation: A Review of Risks and Design Basis for Use of a Liquid Cement Premix for Large Offshore Cementing Operations", IADC/SPE 98970, pp. 1-5, IADC/SPE Drilling Conference, 2006.

(Continued)

*Primary Examiner* — Anthony J Green
(74) *Attorney, Agent, or Firm* — Craig W. Roddy; Tumey L.L.P.

(57) ABSTRACT

A variety of methods and compositions are disclosed, including, in one embodiment a method a cementing in a subterranean formation comprising: providing a set-delayed cement composition comprising water, pumice, hydrated lime, and a set retarder; foaming the set-delayed cement composition; activating the set-delayed cement composition; introducing the set-delayed cement composition into a subterranean formation; and allowing the set-delayed cement composition to set in the subterranean formation. Additional methods, foamed set-delayed cement composition, and systems for cementing are also provided.

21 Claims, 2 Drawing Sheets

(56) References Cited

U.S. PATENT DOCUMENTS

| | | |
|---|---|---|
| 6,908,508 B2 | 6/2005 | Brothers |
| 7,086,466 B2 | 8/2006 | Roddy et al. |
| 7,199,086 B1 | 4/2007 | Roddy et al. |
| 7,201,798 B2 | 4/2007 | Brothers et al. |
| 7,244,303 B2 | 7/2007 | Chatterji et al. |
| 7,338,923 B2 | 3/2008 | Roddy et al. |
| 7,445,669 B2 | 11/2008 | Roddy et al. |
| 7,478,675 B2 | 1/2009 | Roddy et al. |
| 7,559,369 B2 | 7/2009 | Roddy et al. |
| 7,572,329 B2 | 8/2009 | Liu et al. |
| 7,575,055 B2 | 8/2009 | Reddy et al. |
| 7,617,870 B1 | 11/2009 | Roddy et al. |
| 7,670,427 B2 | 3/2010 | Perez-Pena |
| 7,674,332 B2 | 3/2010 | Roddy et al. |
| 7,743,828 B2 | 6/2010 | Roddy et al. |
| 7,784,542 B2 | 8/2010 | Roddy et al. |
| 7,789,150 B2 | 9/2010 | Roddy et al. |
| 7,806,183 B2 | 10/2010 | Roddy et al. |
| 7,836,954 B2 | 11/2010 | Morgan et al. |
| 7,855,170 B2 | 12/2010 | Perera et al. |
| 7,863,224 B2 | 1/2011 | Keys et al. |
| 7,867,954 B2 | 1/2011 | Warrender et al. |
| 7,892,352 B2 | 2/2011 | Roddy et al. |
| 7,964,538 B2 | 6/2011 | Perera et al. |
| 8,038,790 B1 | 10/2011 | Dubey et al. |
| 8,048,219 B2 | 11/2011 | Woolfsmith |
| 8,183,186 B2 | 5/2012 | Luo |
| 8,281,859 B2 | 10/2012 | Roddy et al. |
| 8,297,357 B2 | 10/2012 | Brenneis et al. |
| 8,307,899 B2 | 11/2012 | Brenneis et al. |
| 8,403,045 B2 | 3/2013 | Brenneis et al. |
| 8,476,203 B2 | 7/2013 | Patil |
| 8,486,869 B2 | 7/2013 | Brenneis et al. |
| 8,851,173 B2 | 10/2014 | Brothers et al. |
| 8,899,329 B2 | 12/2014 | Chatterji et al. |
| 8,910,708 B2 | 12/2014 | Chatterji et al. |
| 9,212,534 B2 | 12/2015 | Ballew et al. |
| 9,227,872 B2 | 1/2016 | Boul |
| 9,255,031 B2 | 2/2016 | Pisklak |
| 9,255,454 B2 | 2/2016 | Lewis |
| 9,260,343 B2 | 2/2016 | Brothers |
| 9,328,281 B2 * | 5/2016 | Agapiou ................. C04B 28/18 |
| 9,328,583 B2 | 5/2016 | Pisklak |
| 9,346,711 B2 * | 5/2016 | Chatterji ................. C04B 22/00 |
| 9,534,165 B2 | 1/2017 | Agapiou |
| 2002/0050232 A1 | 5/2002 | Yamashita et al. |
| 2002/0162657 A1 | 11/2002 | Tumlin et al. |
| 2003/0121456 A1 | 7/2003 | Griffith et al. |
| 2003/0188669 A1 | 10/2003 | Sobolev et al. |
| 2003/0221778 A1 | 12/2003 | Musch et al. |
| 2004/0112600 A1 | 6/2004 | Luke et al. |
| 2004/0127606 A1 | 7/2004 | Goodwin |
| 2004/0149174 A1 * | 8/2004 | Farrington ............... C04B 24/12 |
| | | 106/802 |
| 2004/0211342 A1 | 10/2004 | Sprouts et al. |
| 2004/0226484 A1 | 11/2004 | Chatterji et al. |
| 2005/0079016 A1 | 4/2005 | Greenwood et al. |
| 2006/0025312 A1 | 2/2006 | Santra |
| 2006/0041060 A1 | 2/2006 | George et al. |
| 2006/0054320 A1 | 3/2006 | Brothers et al. |
| 2006/0166834 A1 | 7/2006 | Roddy et al. |
| 2006/0249054 A1 | 11/2006 | Brothers et al. |
| 2006/0249289 A1 | 11/2006 | Brothers et al. |
| 2007/0051280 A1 | 3/2007 | Fyten |
| 2007/0089643 A1 | 4/2007 | Roddy et al. |
| 2007/0125534 A1 | 6/2007 | Reddy et al. |
| 2007/0235192 A1 | 10/2007 | Michaux et al. |
| 2007/0289744 A1 | 12/2007 | Bringamon et al. |
| 2008/0066652 A1 | 3/2008 | Fraser et al. |
| 2008/0169100 A1 | 7/2008 | Lewis et al. |
| 2009/0011207 A1 | 1/2009 | Dubey |
| 2009/0020044 A1 | 1/2009 | Constantz et al. |
| 2009/0038800 A1 | 2/2009 | Ravi et al. |
| 2009/0105099 A1 | 4/2009 | Warrender et al. |
| 2009/0124522 A1 | 5/2009 | Roddy et al. |
| 2009/0200029 A1 * | 8/2009 | Roddy ................. C04B 28/02 |
| | | 166/293 |
| 2010/0016183 A1 | 1/2010 | Roddy et al. |
| 2010/0025039 A1 | 2/2010 | Roddy et al. |
| 2010/0041792 A1 | 2/2010 | Roddy et al. |
| 2010/0044043 A1 | 2/2010 | Roddy et al. |
| 2010/0193982 A1 | 8/2010 | Genolet |
| 2010/0258312 A1 | 10/2010 | Brenneis et al. |
| 2010/0270016 A1 | 10/2010 | Carelli et al. |
| 2010/0273912 A1 | 10/2010 | Roddy et al. |
| 2010/0282466 A1 | 11/2010 | Brenneis et al. |
| 2010/0292365 A1 | 11/2010 | Roddy |
| 2010/0313795 A1 | 12/2010 | Guynn et al. |
| 2011/0017452 A1 | 1/2011 | Benkley et al. |
| 2011/0132605 A1 | 6/2011 | Sarap et al. |
| 2011/0162845 A1 | 7/2011 | Ravi |
| 2011/0305830 A1 | 12/2011 | Frantz et al. |
| 2012/0018155 A1 | 1/2012 | Patil |
| 2012/0167803 A1 | 7/2012 | Luo |
| 2012/0186494 A1 | 7/2012 | Roddy |
| 2012/0190769 A1 | 7/2012 | Patil |
| 2012/0192768 A1 | 8/2012 | Ravi |
| 2012/0211227 A1 | 8/2012 | Thaemlitz |
| 2012/0214901 A1 | 8/2012 | Bury |
| 2012/0249552 A1 | 10/2012 | Harvill et al. |
| 2012/0251079 A1 | 10/2012 | Meschter et al. |
| 2012/0252304 A1 | 10/2012 | Vaughn |
| 2012/0291674 A1 | 11/2012 | Brenneis et al. |
| 2012/0325478 A1 | 12/2012 | Muthusamy et al. |
| 2013/0233550 A1 | 9/2013 | Brothers |
| 2013/0248183 A1 | 9/2013 | Pisklak |
| 2014/0083701 A1 | 3/2014 | Boul et al. |
| 2014/0090843 A1 | 4/2014 | Boul et al. |
| 2014/0190696 A1 | 7/2014 | Iverson |
| 2014/0202698 A1 | 7/2014 | Pisklak et al. |
| 2014/0318419 A1 | 10/2014 | Chatterji et al. |
| 2015/0175481 A1 | 6/2015 | Pisklak |
| 2015/0175869 A1 | 6/2015 | Agapiou |
| 2015/0197033 A1 | 7/2015 | Agapiou |
| 2015/0197453 A1 | 7/2015 | Pisklak |

OTHER PUBLICATIONS

Rae et al., "Liquid Cement Premix Introduces New Solutions to Conventional Cementing Problems", IADC/SPE 35086, pp. 393-400, IADC/SPE Drilling Conference, 1996.
Rae et al., "Liquid Cement Premix for Improved Abandonment and Workover Operations", SPE 36477, pp. 637-643, SPE, Inc., 1996.
Anderson et al., "New Technology Eliminates Bulking in Cementing Operations", SPE 36478, pp. 645-653, SPE, Inc., 1996.
Anderson et al., "New Technology Improves Cement Slurry Design", SPE 36973, pp. 127-136, SPE, Inc., 1996.
Shaefer et al., "Utilizing 'Over-Seas' Technology Improves the Cementing Processes in the DJ Basin of Colorado", SPE 80940, pp. 1-8, SPE, Inc., 2003.
"Liquid Stone® Cement Technology", Product Sales Bulletin, BJ Services Company, pp. 1-2, Oct. 19, 2004.
HES brochure "Micro Matrix® Cement Retarder", H01481, Aug. 2007.
HES brochure "CFR-3™ Cement Friction Reducer", H01325, Oct. 2005.
Hess Pumice Products, Inc., "Fact Sheet", located at website www.hesspumice.com, printed from Internet Mar. 2012.
PCT Search Report for PCT International Application No. PCT/US2013/029489 dated Apr. 19, 2013.
PCT Written Opinion for PCT International Application No. PCT/US2013/029489 dated Apr. 19, 2013.
"Conduction Calorimetric Investigation of the effect of Retarders on the Hydration of Portland Cement", V.S. Ramachandran and M.S. Lowery—Thermochimica Arts, 195 (1992) 373-387.
"Competitive Adsorption of Phosphate and Phosphonates onto Goethite", Bernd Nowack and Alan T. Stone—Water Research 40 (2006) 2201-2209.
"Molecular Modeling of the Mechanism of Action of Phosphonate Retarders on Hydrating Cements", Peter V. Coveney and William Humphries—J. Chem. Soc., Faraday Trans., 1996, 92(5, 831-841).

(56) References Cited

OTHER PUBLICATIONS

Yana, Y. et al., (1996). "Growth and Engineering of Microporous Zeolite Films and Coatings." MRS Proceedings, 431, p. 211.
Malvern Brochure "Zetasizer Nano ZS" dated 2011.
Nissan Chemical Brochure "Snowtex®" dated 2007.
ThermPhos Brochure "Dequest® 2006" printed from the Internet on Mar. 25, 2013.
OFI Testing Equipment, Inc. Brochure "Ultrasonic Cement Analyzer" dated 2013.
HESS Brochure "Pumice Pozz for Well Cements" dated 2013.
BASF Brochure "Oilfield Chemicals Product Range" dated Jul. 2010.
Halliburton Brochure "Micro Matrix®" dated Nov. 2006.
ThermPhos Brochure "Dequest® 2066" printed from the Internet on Nov. 18, 2013.
Benge, O.G. et al., "Evaluation of Blast Furnace Slag Slurried for Oilfield Application" SPE 27449, pp. 169-180, SPE, Inc., 1994.
Halliburton Brochure "Baroid" dated Mar. 25, 2010.
Allahverdi, A. et al., (2006). "Chemical activation and set acceleration of lime-natural pozzolan cement." Ceramics—Silikaty, 193-199.
Brito, A. et al., (2004). "High surface area support, catalyst derived from natural pumice." Study of pretreatment variables. Ind. Eng. Chem. Res., 443, 1659-1664.
Johnson, C.D. et al., (2007). "Zeolitisation of pumice-microporous materials on macroporous support structures derived from natural minerals." J. Mat. Chem., 17, 476-484.
Mielenz, R.C. et al., (1950). "Effect of calcination on natural pozzolans." Symposium on use of pozzolanic materials mortars and concretes (pp. 43-92). ASTM.
Ottana, R. et al., (1982). "Hydrothermal synthesis of zeolites from pumice in alkaline and saline environment." Zeolites, 2, 295-298.
Palomo, A. et al., (2011). "Alkaline activation, procedure for transforming fly ash into new materials. Part I: Applications." World of Coal Ash (WOCA) Conference (pp. 1-14). Denver, CO:http://www.flyash.info/.
Pisklak, T.J. et al., (2004). "Preparation and characterization of mordenite thin films via pulsed laser deposition." Journal of Porous Materials, 11(4), 191-209.
Rebrov, E.V. et al., (2009). "Sol-gel synthesis of zeolite coatings and their application in catalytic microstructured reactors." Catalysis in Industry, 1(4), 322-347.
Saija, L.M. et al., (1983). "Zeolitization of pumice in ash-sodium salt solutions." Mat. Chem. Phys., 8, 207-216.
Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research, 13(1), 1-7.
U.S. Appl. No. 14/067,143, filed Oct. 30, 2013.
U.S. Appl. No. 14/019,730, filed Sep. 6, 2013.
U.S. Appl. No. 14/048,486, filed Oct. 8, 2013.
U.S. Appl. No. 14/048,463, filed Oct. 8, 2013.
U.S. Office Action for U.S. Appl. No. 13/417,001 dated Apr. 16, 2014.
HES brochure Enhancer 923™ Cement Agent, H07745 Jun. 2010.
Ramy N.Eid, Liquid Cement: Changing the Paradigm, Society of Petroleum Engineers, Apr. 15, 2007.
Notice of Allowance for U.S. Appl. No. 13/417,001 dated Mar. 9, 2012.
Search Report and Written Opinion for International Application No. PCT/US2014/032150 dated Aug. 21, 2014.
Office Action for U.S. Appl. No. 14/478,869 dated Feb. 26, 2015.
Office Action for U.S. Appl. No. 14/098,198 dated Nov. 20, 2014.
Office Action for U.S. Appl. No. 14/067,143 dated Mar. 12, 2015.
Search Report and Written Opinion for International Application PCT/US14/054791 dated Sep. 9, 2014.
Search Report and Written Opinion for International Application PCT/US14/054799 dated Sep. 9, 2014.
Search Report and Written Opinion for International Application PCT/US14/054497 dated Sep. 8, 2014.
Search Report and Written Opinion for International Application PCT/US14/04794 dated Sep. 9, 2014.
Search Report and Written Opinion for International Application PCT/US14/054496 dated Sep. 8, 2014.
Search Report and Written Opinion for International Application PCT/US14/054380 dated Sep. 5, 2014.
Search Report and Written Opinion for International Application PCT/US14/067112 dated Mar. 5, 2015.
Search Report and Written Opinion for International Application PCT/US14/068804 dated Mar. 17, 2015.
Search Report and Written Opinion for PCT Application No. PCT/US2015/017564 dated Jun. 6, 2015.
Search Report and Written Opinion for PCT Application No. PCT/US2015/019709 dated May 22, 2015.
Final Official Action for U.S. Appl. No. 14/098,198 dated Jun. 19, 2015.
Office Action for U.S. Appl. No. 14/090,573 dated Jun. 12, 2015.
Final Office Action for U.S. Appl. No. 14/478,869 dated Jun. 17, 2015.
Office Action for U.S. Appl. No. 13/854,115 dated Jul. 15, 2015.
Final Office Action for U.S. Appl. No. 14/067,143 dated Aug. 12, 2015.
Office Action for U.S. Appl. No. 14/019,730 dated Jun. 3, 2015.
Office Action for U.S. Appl. No. 14/048,486 dated Aug. 17, 2015.
Office Action for U.S. Appl. No. 14/048,463 dated Sep. 9, 2015.
Office Action for U.S. Appl. No. 14/478,813 dated Sep. 10, 2015.
Final Office Action for U.S. Appl. No. 14/019,730 dated Sep. 23, 2015.
International Search Report and Written Opinion for PCT/US15/21837 dated Jun. 23, 2015.
AkzoNobel Colloidal Silica, "Perspectives on Colloidal Silica," https://www.aksonobel.com/colloidalsilica/silica_Facts/perpectives, Jul. 9, 2015.
Office Action for U.S. Appl. No. 14/202,625 dated Oct. 21, 2015.
Office Action for U.S. Appl. No. 14/194,125 dated Oct. 16, 2015.
Office Action for U.S. Appl. No. 14/221,479 dated Sep. 30, 2015.
Office Action for U.S. Appl. No. 14/090,494 dated Sep. 24, 2015.
Canadian Office Action for Application No. 2,866,602 dated Nov. 30, 2015.
Final Office Action for U.S. Appl. No. 14/048,463 dated Jan. 14, 2016.
Office Action for U.S. Appl. No. 14/098,198 dated Jan. 20, 2016.
Final Office Action for U.S. Appl. No. 14/090,494 dated Feb. 1, 2016.
Final Office Action for U.S. Appl. No. 14/202,625 dated Feb. 24, 2016.
USPTO Notice of Allowance for U.S. Appl. No. 14/032,734 dated Feb. 17, 2016.
USPTO Office Action for U.S. Appl. No. 14/032,734 dated Sep. 24, 2016.
USPTO Non-Final Office Action for U.S. Appl. No. 14/478,813 dated Sep. 30, 2016.
E.B. Nelson. "Well Cementing". pp. 3-2. 1990.
How Microsilica Improves Concrete, Publication #C850327. Copyright 1985, The Aberdeen Group.
Non-final Rejection for U.S. Appl. No. 15/087,961 dated Apr. 17, 2017.
Non-final Rejection for U.S. Appl. No. 15/162,245 dated Apr. 21, 2017.

* cited by examiner

FOAMING OF SET-DELAYED CEMENT COMPOSITIONS COMPRISING PUMICE AND HYDRATED LIME

CROSS-REFERENCE TO RELATED APPLICATIONS

This application is a divisional of U.S. patent application Ser. No. 14/032,734, filed on Sep. 20, 2013, (now U.S. Pat. No. 9,328,281) which is a continuation-in-part of U.S. patent application Ser. No. 13/417,001, filed on Mar. 9, 2012, (now U.S. Pat. No. 8,851,173) titled "Set-Delayed Cement Compositions Comprising Pumice and Associated Methods," (now U.S. Pat. No. 8,851,173), and also claims priority to U.S. Provisional Patent Application No. 61/875,410, filed on Sep. 9, 2013, titled "Foaming of Set-Delayed Cement Compositions Comprising Pumice and Hydrated Lime" the entire disclosures of which are incorporated herein by reference.

BACKGROUND

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for at least about one day (e.g., at least about 7 days, about 2 weeks, about 2 years or more) at room temperature (e.g., about 80° F.) in quiescent storage. When desired for use, the set-delayed cement compositions should be capable of being activated whereby reasonable compressive strengths are developed. For example, a cement set accelerator may be added to a set-delayed cement composition whereby the composition sets into a hardened mass. Among other things, the set-delayed cement composition may be suitable for use in wellbore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

While set-delayed cement compositions have been developed heretofore, challenges exist with their successful use in subterranean cementing operations. For example, set-delayed cement compositions prepared with Portland cement may have undesired gelation issues which can limit their use and effectiveness in cementing operations. Other set-delayed compositions that have been developed, for example, those comprising hydrated lime and quartz, may be effective in some operations but may have limited use at lower temperatures as they may not develop sufficient compressive strength when used in subterranean formations having lower bottom hole static temperatures.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
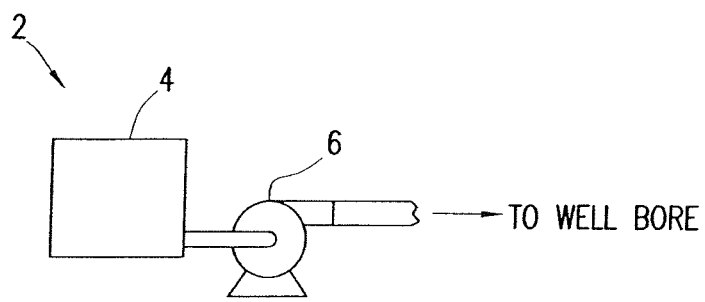
FIG. 1 illustrates a system for preparation and delivery of a set-delayed cement composition to a wellbore in accordance with certain embodiments.

The example embodiments relate to subterranean cementing operations and, more particularly, in certain embodiments, to set-delayed cement compositions and methods of using set-delayed cement compositions in subterranean formations.

Embodiments of the set-delayed cement compositions may generally comprise water, pumice, hydrated lime, and a set retarder. Optionally, the set-delayed cement compositions may further comprise a dispersant. Embodiments of the set-delayed cement compositions may be foamed. Advantageously, embodiments of the set-delayed cement compositions may be capable of remaining in a pumpable fluid state for an extended period of time. For example, the set-delayed cement compositions may remain in a pumpable fluid state for at least about 1 day, about 2 weeks, about 2 years, or longer. Advantageously, the set-delayed cement compositions may develop reasonable compressive strengths after activation at relatively low temperatures. While the set-delayed cement compositions may be suitable for a number of subterranean cementing operations, they may be particularly suitable for use in subterranean formations having relatively low bottom hole static temperatures, e.g., temperatures less than about 200° F. or ranging from about 100° F. to about 200° F. In alternative embodiments, the set-delayed cement compositions may be used in subterranean formations having bottom hole static temperatures up to 450° F. or higher.

The water used in embodiments of the set-delayed cement compositions may be from any source provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the set-delayed cement composition in an amount in the range of from about 33% to about 200% by weight of the pumice. In certain embodiments, the water may be present in the set-delayed cement compositions in an amount in the range of from about 35% to about 70% by weight of the pumice. One of ordinary skill in the art with the benefit of this disclosure will recognize the appropriate amount of water for a chosen application.

Embodiments of the set-delayed cement compositions may comprise pumice. Generally, pumice is a volcanic rock that can exhibit cementitious properties in that it may set and harden in the presence of hydrated lime and water. The pumice may also be ground. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 microns, from about 5 microns to about 100 microns, or from about 10 microns to about 50 microns. In one particular embodiment, the pumice may have a mean particle size of less than about 15 microns. An example of a suitable pumice is available from Hess Pumice Products, Inc., Malad, Id., as DS-325 lightweight aggregate, having a particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for a chosen application.

Embodiments of the set-delayed cement compositions may comprise hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments of the set-delayed cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the pumice, for example. In some embodiments, the hydrated lime may be present in an amount ranging between any of and/or including any of about 0%, about 20%, about 40%, about 60%, about 80%, or about 100% by weight of the pumice. In some embodiments, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

Embodiments of the set-delayed cement compositions may comprise a set retarder. A broad variety of set retarders may be suitable for use in the set-delayed cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the set-delayed cement compositions in an amount sufficient to delay the setting for a desired time. In some embodiments, the set retarder may be present in the set-delayed cement compositions in an amount in the range of from about 0.01% to about 10% by weight of the pumice. In specific embodiments, the set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of the set retarder to include for a chosen application.

As previously mentioned, embodiments of the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 available from Geo Specialty Chemicals. Ambler, Pa. Other suitable dispersants may be polycarboxylated ether dispersants such as Liquiment® 5581F and Liquiment® 514L available from BASF Corporation Houston, Tex.: or Ethacryl G available from Coatex. Genay. France. An additional example of a suitable commercially available dispersant is CFR™-3 dispersant, available from Halliburton Energy Services, Inc, Houston, Tex. Of particular importance in regards to the examples that follow, is that the Liquiment® 514L dispersant comprises 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific embodiments, the dispersant may be present in an amount ranging between any of and/or including any of about 0.01%, about 0.1%, 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

Embodiments of the set-delayed cement compositions may comprise a mechanical property enhancing additive. Mechanical-property-enhancing additives may be included in embodiments of the set-delayed compositions to, for example, ensure adequate compressive strength and long-term structural integrity. These properties can be affected by the strains, stresses, temperature, pressure, and impact effects from a subterranean environment. Examples of mechanical property enhancing additives include fibers, such as graphitic carbon fibers, glass fibers, steel fibers, mineral fibers, silica fibers, polyester fibers, polyamide fibers, and polyolefin fibers, among others. Specific examples of graphitic carbon fibers include fibers derived from polyacrylonitrile, rayon, and petroleum pitch. Where used, the mechanical-property-enhancing additives may be present in an amount from about 0.01% to about 5% by weight of the pumice. In specific embodiments, the mechanical-property-enhancing additives may be present in an amount ranging between any of and/or including any of about 0.01%, about 0.1%, 0.5%, about 1%, about 2%, about 3%, about 4%, or about 5% by weight of the pumice. One of ordinary skill in the art, with the benefit of this disclosure, will recognize the appropriate amount of the mechanical-property-enhancing additives to include for a chosen application.

Other additives suitable for use in subterranean cementing operations also may be included in embodiments of the set-delayed cement compositions. Examples of such additives include, but are not limited to, weighting agents, lightweight additives, gas-generating additives, lost-circulation materials, filtration-control additives, fluid-loss-control additives, defoaming agents, foaming agents, thixotropic additives, and combinations thereof. In embodiments, one or more of these additives may be added to the set-delayed cement composition after storing but prior to placement of the set-delayed cement composition into a subterranean formation. A person having ordinary skill in the art, with the benefit of this disclosure, will readily be able to determine the type and amount of additive useful for a particular application and desired result.

Those of ordinary skill in the art will appreciate that embodiments of the set-delayed cement compositions generally should have a density suitable for a particular application. By way of example, the set-delayed cement compositions may have a density in the range of from about 4 pounds per gallon ("lb/gal") to about 20 lb/gal. In certain embodiments, the set-delayed cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

As discussed above, embodiments of the set-delayed cement compositions may be foamed. Embodiments of the set-delayed cement compositions may be foamed to provide a lightweight composition that does not exert excessive force on formations penetrated by the wellbore. In addition to being lightweight, a foamed composition may also improve the ability of the composition to maintain pressure and prevent the flow of formation fluids into and through the composition during its transition time. Foamed compositions may also be advantageous because they have low fluid loss properties, thus limiting loss of fluid circulation. Additionally, foamed compositions when set may also have a lower modulus of elasticity than non-foamed compositions, which is often desirable as it enables the resultant set cement composition to resist stresses exerted on the composition in situ.

In particular embodiments, the set-delayed cement composition may be foamed at the well site. By way of example, the set-delayed cement compositions may be foamed immediately prior to use. Embodiments may be foamed with a foaming additive and by entraining gas into the set-delayed cement compositions. In particular embodiments, the foaming additive and gas may be introduced after combination of the composition with an activator. The set-delayed cement compositions may be foamed, for example, to provide a set-delayed cement composition with a reduced density.

The gas used for foaming the composition may be any suitable gas for foaming, including, but not limited to: air, nitrogen, and combinations thereof. Generally, the gas should be in an amount sufficient to form the desired foam. Foaming additives may be included in embodiments to, for example, facilitate foaming and/or stabilize the resultant foam formed therewith.

In particular embodiments, the foaming additive may include a surfactant or combination of surfactants that reduce the surface tension of the water. By way of example, the foaming agent may comprise an anionic, nonionic, amphoteric (including zwitterionic surfactants), cationic surfactant, or mixtures thereof. Examples of suitable foaming additives include, but are not limited to: betaines; anionic surfactants such as hydrolyzed keratin; amine oxides such as a alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyl-tallowammonium chloride and trimethylcocoammonium chloride; C8 to C22 alkylethoxylate sulfates; and combinations thereof. Specific examples of suitable foaming agents include mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable foaming additives are ZONESEALANT™ 2000 agent and Foamer 1026™, both available from Halliburton Energy Services Inc., Houston, Tex. Embodiments may be foamed within a foam quality range of between about 5% to about 80% and, more particularly, from about 18% to about 38%. As used herein, the term "foam quality" refers to the volume of entrained gas and is defined by the following formula: Foam Quality= (Total Foam Volume−Liquid Volume)/Total Foam Volume.

As previously mentioned, the cement compositions may have a delayed set in that they remain in a pumpable fluid state for at least one day (e.g., at least about 1 day, about 2 weeks, about 2 years, or longer) at room temperature in quiescent storage. For example, the set-delayed cement compositions may remain in a pumpable fluid state for a period of time from about 1 day, about 2 weeks, about 2 years, or longer. In some embodiments, the set-delayed cement compositions may remain in a pumpable fluid state for at least about 1 day, about 7 days, about 10 days, about 20 days, about 30 days, about 40 days, about 50 days, about 60 days, about 2 years, or longer. A fluid is considered to be in a pumpable fluid state where the fluid has a consistency of less than 70 Bearden units of consistency ("Bc"), as measured on a high-temperature high-pressure consistometer at room temperature (e.g., about 80° F.) in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by combination with an activator) to thereby set into a hardened mass. By way of example, embodiments of the set-delayed cement compositions may be activated to set to form a hardened mass in a tune period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days.

In some embodiments, the set-delayed cement compositions may set to have a desirable compressive strength after activation. Compressive strength is generally the capacity of a material or structure to withstand axially directed pushing forces. The compressive strength may be measured at a specified time after the set-delayed cement composition has been activated and the resultant composition is maintained under specific temperature and pressure controls. Compressive strength can be measured by either a destructive method or non-destructive method. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods typically may employ an Ultrasonic Cement Analyzer ("UCA"), available from Fann Instrument Company, Houston, Tex. Compressive strengths may be determined in accordance with API RP 10B-2, *Recommended Practice for Testing Well Cements*, First Edition. July 2005.

By way of example, the set-delayed cement composition, may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement composition may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

Embodiments may include the addition of a cement set activator to the set-delayed cement compositions. Examples of suitable cement set activators include, but are not limited to: amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

The cement set activator should be added to embodiments of the set-delayed cement composition in an amount sufficient to activate the set-delayed cement composition to set into a hardened mass. In certain embodiments, the cement set activator may be added to the set-delayed cement composition in an amount in the range of about 1% to about 20% by weight of the pumice. In specific embodiments, the cement set activator may be present in an amount ranging between any of and/or including any of about 1%, about 5%, about 10%, about 15%, or about 20% by weight of the pumice. One of ordinary skill in the art, with the benefit of this disclosure, will recognize the appropriate amount of the cement set activator to include for a chosen application.

As will be appreciated by those of ordinary skill in the art, embodiments of the set-delayed cement compositions may be used in a variety of subterranean operations, including primary and remedial cementing. In some embodiments, a set-delayed cement composition may be provided that comprises water, pumice, hydrated lime, a set retarder, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Embodiments may further include activation of the set-delayed cement composition. The activation of the set-delayed cement composition may comprise, for example, the addition of a cement set activator to the set-delayed cement composition.

In some embodiments, a set-delayed cement composition may be provided that comprises water, pumice, hydrated lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day, about 2 weeks, about 2 years, or longer. For example, the set-delayed cement composition may remain in storage for a time period of about 1 day, about 2 days, about 5 days, about 7 days, about 10 days, about 20 days, about 30 days, about 40 days, about 50 days, about 60 days, about 2 years, or longer. In some embodiments, the set-delayed cement composition may remain in storage for a time period in a range of from about 1 day to about 2 years or longer. Thereafter, the set-delayed cement composition may be activated, for example, by addition of a cement set activator, introduced into a subterranean formation, and allowed to set therein. Optionally, the set-delayed cement composition may be foamed prior to introduction into the subterranean formation.

In primary cementing embodiments, for example, embodiments of the set-delayed cement composition may be introduced into an annular space between a conduit located in a wellbore and the walls of a wellbore (and/or a larger conduit in the wellbore), wherein the wellbore penetrates the subterranean formation. The set-delayed cement composition may be allowed to set in the annular space to form an annular sheath of hardened cement. The set-delayed cement composition may form a barrier that prevents the migration of fluids in the wellbore. The set-delayed cement composition may also, for example, support the conduit in the wellbore.

In remedial cementing embodiments, a set-delayed cement composition may be used, for example, in squeeze-cementing operations or in the placement of cement plugs. By way of example, the set-delayed composition may be placed in a wellbore to plug an opening such as a void or crack that is in the formation, in a gravel pack, in the conduit, in the cement sheath, and/or between the cement sheath and the conduit (e.g., a microannulus).

An example embodiment comprises a method of cementing in a subterranean formation comprising: providing a set-delayed cement composition comprising water, pumice, hydrated lime, and a set retarder; foaming the set-delayed cement composition; activating the foamed set-delayed cement composition; introducing the foamed set-delayed cement composition into a subterranean formation; and allowing the foamed set-delayed cement composition to set in the subterranean formation.

An example embodiment comprises a foamed set-delayed cement composition comprising: water, pumice, hydrated lime, a foaming additive, entrained gas, and a set retarder.

An example embodiment comprises a system for cementing comprising: a set-delayed cement composition comprising: water, pumice, hydrated lime, a set retarder, a foaming additive for foaming the set-delayed cement composition; a gas for foaming the set-delayed cement composition; and a cement set activator for activation of the set-delayed cement composition.

Referring now to FIG. 1, preparation of a set-delayed cement composition in accordance with example embodiments will now be described. FIG. 1 illustrates a system 2 for preparation of a set-delayed cement composition and delivery to a wellbore in accordance with certain embodiments. As shown, the set-delayed cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore.

Figure 2A:
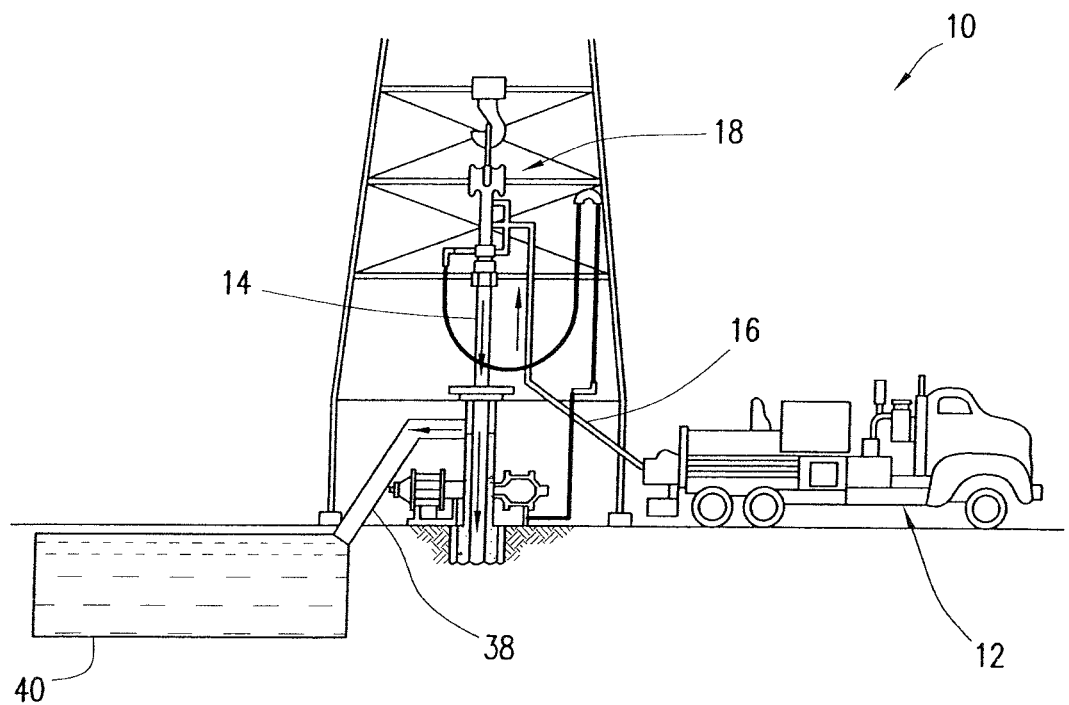
FIG. 2A illustrates surface equipment that may be used in placement of a set-delayed cement composition in a wellbore in accordance with certain embodiments.

An example technique for placing a set-delayed cement composition into a subterranean formation will now be described with reference to FIGS. 2A and 2B. FIG. 2A illustrates surface equipment 10 that may be used in placement of a set-delayed cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a set-delayed cement composition 14 through a feed pipe 16 and to a cementing head 18 which conveys the set-delayed cement composition 14 downhole.

Figure 2B:
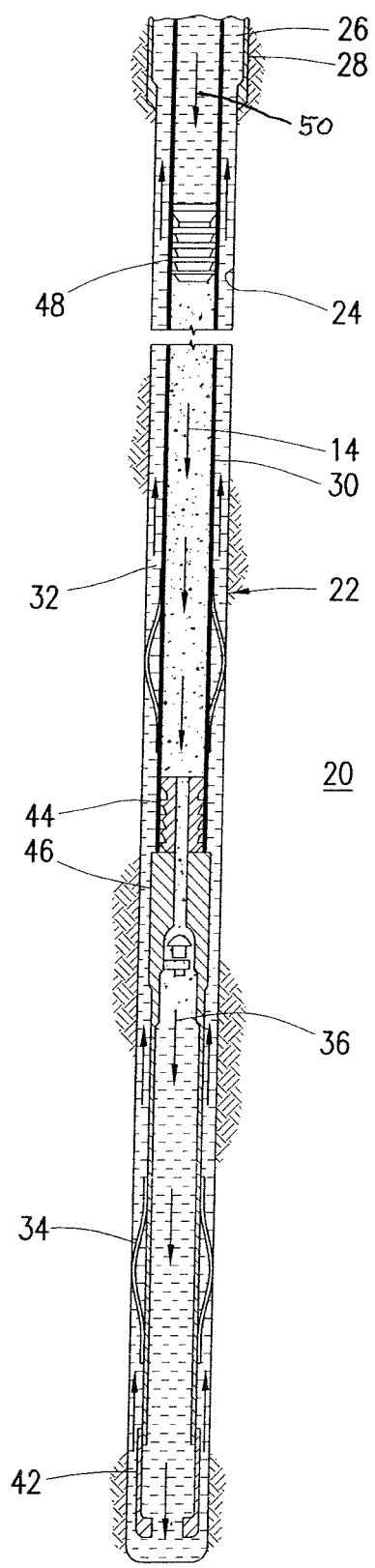
FIG. 2B illustrates placement of a set-delayed cement composition into a wellbore annulus in accordance with certain embodiments.

Turning now to FIG. 2B, the set-delayed cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the set-delayed cement composition 14 may be pumped down the interior of the casing 30. The set-delayed cement composition 14 may be allowed to flow down the interior of the casing 30 through the casing, shoe 42 at the bottom of the casing 30 and up around the casing 30 into the wellbore annulus 32. The set-delayed cement composition 14 may be allowed to set in the wellbore annulus 32, for example, to form a cement sheath that supports and positions the casing 30 in the wellbore 22. While not illustrated, other techniques may also be utilized for introduction of the set-delayed cement composition 14. By way of example, reverse circulation techniques may be used that include introducing the set-delayed cement composition 14 into the subterranean formation 20 by way of the wellbore annulus 32 instead of through the casing 30.

As it is introduced, the set-delayed cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the set-delayed cement composition 14, for example, to separate the set-delayed cement composition 14 from the fluids 36 that may be inside the casing 30 prior to cementing. After the bottom plug 44 reaches the landing collar 46, a diaphragm or other suitable device should rupture to allow the set-delayed cement composition 14 through the bottom plug 44. In FIG. 2B, the bottom plug 44 is shown on the landing collar 46. In the illustrated embodiment, a top plug 48 may be introduced into the wellbore 22 behind the set-delayed cement composition 14. The top plug 48 may separate the set-delayed cement composition 14 from a displacement fluid 50 and also push the set-delayed cement composition 14 through the bottom plug 44.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of certain aspects of some embodiments are given. In no way should the following examples be read to limit, or define, the scope of the embodiments.

Example 1

A sample set-delayed cement composition was prepared with the following components: pumice (DS-325 lightweight aggregate), hydrated lime, dispersant (Liquimee 5581F), primary retarder (Micro Matrix® cement retarder), weighting additive (MicroMax® Weight Additive, available from Halliburton Energy Services, Inc., Houston, Tex.), secondary retarder (HR®-5 cement retarder, available from Halliburton Energy Services, Inc., Houston, Tex.), Class H Portland cement, and water. Each component, with the exception of the primary retarder (Micro Matrix® cement retarder), is presented as a percentage of the weight of pumice (bwoP). The primary retarder is measured in units of gallons per 46 pound sack of pumice (gal/sk). The compositional makeup is listed in Table 1 below.

TABLE 1

Sample Set-Delayed Cement Compositional Makeup

| Material | Amount | Units | Weight (g) | % bw in total |
|---|---|---|---|---|
| Pumice | 100 | % bwoP | 58682.7 | 55.56 |
| Hydrated lime | 20 | % bwoP | 11736.5 | 11.11 |
| Dispersant | 0.5 | % bwoP | 291.1 | 0.28 |
| Primary Retarder | 0.06 | gal/sk | 734.6 | 0.70 |
| Weighting Additive | 2 | % bwoP | 1173.7 | 1.11 |
| Secondary Retarder | 0.5 | % bwoP | 293.4 | 0.28 |
| Portland Cement | 2 | % bwoP | 1173.7 | 1.11 |
| Water | 53.7 | % bwoP | 31534.5 | 29.86 |
| Total | — | — | 105620.2 | 100 |

The sample in Example 1 remained fluid, mixable, pumpable, and stable with no solids settling or gelation for greater than 40 days. The sample had a measured density of 13.5 pounds per gallon. Minimal doses of dispersant were added during the storage period to maintain the slurry's optimal rheology. This exemplary sample serves as the base slurry for the remaining examples provided below.

Example 2

The rheological properties of the sample set-delayed cement composition of Example 1 were measured after storing the samples at room temperature and pressure for a period of 41 days. After preparation, the rheological properties of the samples were determined using a Model 35A Fann Viscometer and a No. 2 spring with a Fann Yield Stress Adapter, in accordance with the procedure set forth in API RP Practice 10B-2, *Recommended Practice for Testing Well Cements*. The results of this test are set forth in Table 2 below.

TABLE 2

Viscosity Tests

| Age of Sample | | FYSA Readings | | | | | | |
|---|---|---|---|---|---|---|---|---|
| (days) | RPM | 3 | 6 | 100 | 200 | 300 | 3D | 6D |
| 41 | AVG. | 13 | 13 | 35 | 56 | 75.5 | 5 | 4 |

Example 3

Three sample set-delayed cement compositions, samples 1-3, and two controls, controls 1 and 2, were prepared from the base slurry described in Example 1. Foamer 1026™, a foaming additive, was added to each of the three samples in varying amounts after a time period of 41 days. Additionally, a cement set activator, CaCl$_2$, was added to sample 2 and control 2. The amount of the cement set activator added to each sample was sufficient to deliver a 5% by weight of pumice activator amount to the set-delayed cement composition. The base and foamed densities were measured. Additionally, the destructive compressive strength was measured using a mechanical press in accordance with API RP Practice 10B-2, *Recommended Practice for Testing Well Cements*. Additionally, the destructive compressive strength was measured by allowing the samples to cure in a 2" by 4" plastic cylinder that was placed in a water bath at 190° F. to form set cylinders. Immediately after removal from the water bath, destructive compressive strengths were determined using a mechanical press in accordance with API RP 10B-2, *Recommended Practice for Testing Well Cements*. The results of this test are set forth below. The reported compressive strengths are an average for two cylinders of each sample. The samples and controls were cured at 1 atmosphere, 190° F.; compressive strength measurements were taken at 72 hours.

TABLE 3

Compositional Makeup and Characteristics

| | Sample 1 | Sample 2 | Sample 3 | Control 1 | Control 2 |
|---|---|---|---|---|---|
| Sample Weight (g) | 1363.2 | 1363.2 | 1363.2 | 817.5 | 817.5 |
| Foaming Additive (g) | 8.14 | 12.21 | 14 | — | — |
| Activator (g) | — | 37.87 | — | — | 25.8 |
| Base Density (ppg) | 13.5 | 13.5 | 13.5 | 13.5 | 13.3* |
| Foamed Density (ppg) | 11 | 9.1 | 9.2 | — | — |
| Foam Quality | 19% | 33% | 32% | — | — |
| Compressive Strength (psi) | 639.37 | 534.45 | 135.18 | 1222.46 | 1360.14 |

*Density of Control 2 with the Activator.

In addition to the characteristics of Table 3, the foam stability of samples 1-3 was measured in both the slurry state and the set state. This data is set forth in Table 4 below.

TABLE 4

Foam Stability Measurements.

| | Foam Stability | | | | | |
|---|---|---|---|---|---|---|
| | Sample 1 | | Sample 2 | | Sample 3 | |
| | Slurry | Set | Slurry | Set | Slurry | Set |
| More than a trace of free fluid? | N | N | N | N | N | N |
| Bubbles on surface of bubble coalescing (breaking, enlargement, merging)? | N | N | N | N | N | N |
| Excessive column-height reduction? | N | N | N | N | N | N |
| Signs of density segregation (streaking or dark coloration from top to bottom)? | N | N | N | N | N | N |

The Archimedes Method was used to measure the slurry density of Samples 1-3 in top, middle, and bottom portions. Densities that were close in weight from top to bottom indicate stable foam while considerable variation in densities indicates unstable foam. All units are in pounds per gallon. This data is set forth in Table 5 below.

TABLE 5

Density Uniformity

| Archimedes Method | Example 1 | Example 2 | Example 3 |
|---|---|---|---|
| Top (ppg) | 10.50 | 8.95 | 9.26 |
| Middle (ppg) | 10.52 | 8.99 | 9.30 |
| Bottom (ppg) | 10.46 | 8.83 | 9.25 |

Lastly, the rheology of foamed Samples 1-3 was measured using the same technique as used in Example 2 to measure the rheology of the base slurry. The base slurry is designated as Control 1 in Table 6 below. The rheology data is set forth in Table 6 below.

TABLE 6

Viscosity Tests

| | Density (ppg) | RPM | 3 | 6 | 100 | 200 | 300 | 3D | 6D |
|---|---|---|---|---|---|---|---|---|---|
| | | | | | FYSA Readings | | | | |
| Control 1 | 13.5 | AVG. | 13 | 13 | 35 | 56 | 75.5 | 5 | 4 |
| Sample 1 | 11 | AVG. | 10 | 10.5 | 33.5 | 50.25 | 65.5 | 3.5 | 2.5 |
| Sample 2 | 9.1 | AVG. | 2.25 | 3 | 17.5 | 29.5 | 40 | 1.5 | 1 |
| Sample 3 | 9.2 | AVG. | 17 | 17.5 | 40.5 | 56.5 | 70.5 | 12 | 9 |

Example 3 thus indicates that the foamed slurries exhibit good compressive strength while maintaining suitable rheologies and uniform densities.

Example 4

Two sample set-delayed cement compositions, samples 4 and 5, were prepared from the base slurry described in Example 1. A cement set activator, CaCl$_2$, was added to the samples in an amount sufficient to deliver a 5% by weight of pumice activator amount to the set-delayed cement composition. Sample 5 further included graphitic carbon fibers in an amount of about 0.18% by weight of the pumice. The graphitic carbon fibers were PAN carbon fibers derived from polyacrylonitrile. Foamer 1026™, a foaming additive, was added to each of the samples in an amount of 0.18% by weight of the pumice. Additionally, the destructive compressive strength was measured by allowing the samples to cure in a 2" by 4" plastic cylinder that was placed in a water bath at 190° F. to form set cylinders. Immediately after removal from the water bath, destructive compressive strengths were determined using a mechanical press in accordance with API RP 10B-2, *Recommended Practice for Testing Well Cements*. The results of this test are set forth below. The reported compressive strengths are an average for three cylinders of each sample. The samples and controls were cured at 1 atmosphere, 190° F.: compressive strength measurements were taken at 72 hours.

TABLE 7

Compositional Makeup and Characteristics

| | Sample 4 | Sample 5 |
|---|---|---|
| Base Slurry (g) | 1000 | 1000 |
| Carbon Fiber (g) | — | 10 |
| Activator (g) | 27.8 | 27.8 |
| Foaming Additive (g) | 10 | 10 |
| Base Density (ppg) | 13.5 | 13.5 |
| Foamed Density (ppg) | 8.33 | 8.33 |
| Compressive Strength (psi) | 62 | 143 |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently. "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the invention. If there is any conflict in the usages of a word or term in this specification and one or more patent(s) or other documents that may be incorporated herein by reference, the definitions that are consistent with this specification should be adopted.

What is claimed is:

1. A method of making a foamed set-delayed cement composition, the method comprising:
   mixing a set-delayed cement composition comprising:
      water,
      pumice,
      a dispersant comprising a polycarboxylated ether;
      hydrated lime, and
      a set retarder comprising a phosphonic acid;
   storing the set-delayed cement composition in a pumpable fluid state for at least about one day;
   adding a foaming additive to the set-delayed cement composition;
   forming the foamed set-delayed cement composition after the step of storing, the forming comprising:
      adding a gas to the set-delayed cement composition.

2. The method of claim 1 wherein the foaming additive is selected from the group consisting of: a betaine; hydrolyzed keratin; an amine oxides; an alkyl or alkene dimethyl amine oxide; a cocoamidopropyl dimethyl amine oxide; a methyl ester sulfonate; an alkyl or alkene dimethyl amidobetaine; cocoamidopropyl betaine; an alpha-olefin sulfonate; a quaternary surfactant; trimethyltallowammonium chloride; trimethylcocoammonium chloride; a C8 to C22 alkylethoxylate sulfate; and any combination thereof.

3. The method of claim 1 wherein the foamed set-delayed cement composition has a foam quality between about 5% to about 80%.

4. The method of claim 1 wherein the foamed set-delayed cement composition has a density between about 9 pounds per gallon to about 11 pounds per gallon.

5. The method of claim 1 wherein the set retarder further comprises at least one retarder selected from the group consisting of a phosphonic acid derivative, a lignosulfonate, a salt, an organic acid, a cellulose derivate, a synthetic co- or ter-polymer comprising sulfonate and carboxylic acid groups, a borate compound, and any combination thereof.

6. The method of claim 1 wherein the dispersant further comprises a sulfonated-formaldehyde-based dispersant.

7. The method of claim 1 wherein the foamed set-delayed cement composition further comprises a cement set activator, and wherein the cement set activator comprises at least one activator selected from the group consisting of an amine, a silicate, zinc formate, calcium acetate, a Group IA hydroxide; a Group IIA hydroxide, a monovalent salt, a divalent salt, nanosilica, a polyphosphate, and any combination thereof.

8. The method of claim 1 wherein the foamed set-delayed cement composition remains in a pumpable state for at least about one day to about one week.

9. The method of claim 1 wherein the pumice has a particle size of about 1 micron to about 200 microns.

10. The method of claim 1 wherein the hydrated lime is present in an amount of about 10% to about 100% by weight of the pumice.

11. The method of claim 1 wherein foamed set delayed cement composition further comprises a set retarder is present in an amount of about 0.01% to about 10% by weight of the pumice.

12. The method of claim 1 wherein foamed set delayed cement composition further comprises a dispersant is present in an amount of about 0.01% to about 5% by weight of the pumice.

13. The method of claim 1 wherein foamed set delayed cement composition further comprises a cement set activator is present in an amount of about 1% to about 20% by weight of the pumice.

14. The method of claim 1 wherein the set-delayed cement composition further comprising at least one mechanical property enhancing additive selected from the group consisting of graphitic carbon fibers, glass fibers, steel fibers, mineral fibers, silica fibers, polyester fibers, polyamide fibers, and polyolefin fibers, and any combinations thereof.

15. The method of claim 14 wherein the mechanical property enhancing additive is present in an amount from about 0.01% to about 5% by weight of the pumice.

16. The method of claim 1 wherein the set-delayed cement composition develops a 24-hour compressive strength of about 500 psi to about 2400 psi.

17. A method of making a foamed set-delayed cement composition, the method comprising:
   mixing a set-delayed cement composition comprising:
      water,
      pumice,
      hydrated lime,
      Portland cement, and
      a set retarder wherein the set retarder comprises a primary retarder and a secondary retarder wherein at least one set retarder comprises a phosphonic acid derivative;
   storing the set-delayed cement composition in a pumpable fluid state for at least about one day;
   foaming the set-delayed cement composition after the step of storing, the foaming comprising:
      adding a foaming additive and a gas to the set-delayed cement composition.

18. The method of claim 17 wherein the set retarder further comprises at least one retarder selected from the group consisting of a phosphonic acid, a lignosulfonate, a salt, an organic acid, a cellulose derivate, a synthetic co- or ter-polymer comprising sulfonate and carboxylic acid groups, a borate compound, and any combination thereof.

19. The method of claim 17 wherein the foamed set-delayed cement composition further comprises a dispersant, and wherein the dispersant comprises at least one dispersant selected from the group consisting of a sulfonated-formaldehyde-based dispersant, a polycarboxylated ether dispersant, and a combination thereof.

20. The method of claim 17 wherein the foamed set-delayed cement composition further comprises a cement set activator, and wherein the cement set activator comprises at least one activator selected from the group consisting of an amine, a silicate, zinc formate, calcium acetate, a Group IA hydroxide; a Group IIA hydroxide, a monovalent salt, a divalent salt, nanosilica, a polyphosphate, and any combination thereof.

21. A foamed cement composition comprising:
   water;
   pumice;
   hydrated lime, wherein a pumice-to-hydrated-lime weight ratio is about 3:1 to about 5:1;
   a polycarboxylated ether dispersant;
   a phosphonic acid set retarder;
   calcium chloride, wherein the calcium chloride is present in a range of about 1% to about 20% by weight of the pumice;
   a foaming additive; and
   a gas;
   wherein the foamed cement composition is foamed to a foam quality between about 18% to about 38%.

* * * * *